United States Patent [19]

Doden et al.

[11] Patent Number: 5,478,143
[45] Date of Patent: Dec. 26, 1995

[54] ANTILOCK BRAKE CONTROL METHOD

[75] Inventors: Berend-Wilhelm Doden, Ludwigsburg; Elmar Müller, Markgröningen, both of Germany

[73] Assignee: Robert Bosch GmbH, Stuttgart, Germany

[21] Appl. No.: 274,495

[22] Filed: Jul. 13, 1994

Related U.S. Application Data

[63] Continuation of PCT/DE92/01068, Dec. 19, 1992.

[30] Foreign Application Priority Data

Jan. 18, 1992 [DE] Germany .................. 42 01 282.1

[51] Int. Cl.⁶ .................. B60T 8/32; B62D 37/00; G05D 16/00
[52] U.S. Cl. .................. 303/150; 303/177
[58] Field of Search .................. 303/93, 100, 103, 303/106, 111, 9.62, 113.5

[56] References Cited

U.S. PATENT DOCUMENTS

| | | | |
|---|---|---|---|
| 4,715,662 | 12/1987 | Van Zanten et al. | 303/100 X |
| 4,898,431 | 2/1990 | Karnopp et al. | 303/110 X |
| 5,136,509 | 8/1992 | van Zanten et al. | 303/95 X |
| 5,211,453 | 5/1993 | Van Zanten | 303/111 |
| 5,229,944 | 7/1993 | Yasuno | 303/100 X |
| 5,255,194 | 10/1993 | Schaufelberger et al. | 303/95 X |
| 5,303,989 | 4/1994 | Yasuno et al. | 303/113.5 X |
| 5,341,297 | 8/1994 | Zomotor et al. | 303/100 X |

FOREIGN PATENT DOCUMENTS

| | | |
|---|---|---|
| 0392164 | 10/1990 | European Pat. Off. . |
| 4109925 | 10/1991 | Germany . |
| 9104891 | 4/1991 | WIPO . |

OTHER PUBLICATIONS

Robert Bosch GmbH, "Automotive Handbook" 3rd edition (1993) pp. 342–343, 582–585.
Zomotor, Adam "Fahrwerktechnik: Fahrverhalten" (1987) pp. 41, 43, 44, 100.

*Primary Examiner*—Josie A. Ballato
*Attorney, Agent, or Firm*—Felfe & Lynch

[57] ABSTRACT

A difference $\delta_2 - \delta_1$ is formed between the steering angle $\delta_2$ actually measured and the steering angle $\delta_1$ calculated from the vehicle transverse acceleration, vehicle speed, and a series of constants. This difference $(\delta_2 - \delta_1)$ is used to displace the working point on the μ-slip curve in the direction of an increase of the lateral stability, i.e., toward smaller slip values. Response can be improved by making the displacement also dependent on the rate of change of this difference or the rate of change of the actual steering angle. Preferably no reaction is produced when the difference is below a threshold angle unless one of the rates exceeds a respective threshold.

7 Claims, 6 Drawing Sheets

ANTILOCK BRAKE CONTROL METHOD

This application is a continuation of PCT/DE92/01068, filed Dec. 19, 1992.

BACKGROUND OF THE INVENTION

For a multiplicity of driving maneuvers, particularly in antilock brake system control operation or in the partial braking range, it is useful to record the instantaneous driving situation so as to permit corrective intervention by means of an actuator or control system if necessary. Such a method is known from U.S. Pat. No. 4,898,431.

SUMMARY OF THE INVENTION

In the invention, the driving situation is improved by means of a simpler system of sensors. Because of the physical relationships between the peripheral and side forces, which are described theoretically by means of the "Kamm circle" model, there is always a conflict of objectives between optimum adaptation to given friction coefficient relationships and sufficient steerability when designing antilock brake system control algorithms and at the application stage (determining the ratio between the peripheral and side forces). It is precisely in the case of dynamic steering maneuvers, particularly on low coefficients of friction, that adequate steerability is not ensured.

This shortcoming has its origin in the fixing of the working point A, which is subject to compromise, in the μ-slip curve (FIG. 1). When driving straight ahead, this point has to be located near the maximum of the curve.

It is possible to differentiate between travel in a straight line and travel round a curve and to recognize dynamic driving maneuvers (for example change of lane) with sufficient accuracy from the following equation by employing the linear single-track model in association with analog steering angle sensors and transverse acceleration sensors:

$$\delta_1 = \left[ \frac{1}{v^2{}_r} + m \left( \frac{l_h \hat{y} c_{sv} - i_v \hat{y} c_{sh}}{l \hat{y} c_{sv} \hat{y} c_{sh}} \right) \right] \hat{y} a_q$$

$$\underbrace{\phantom{m \left( \frac{l_h \hat{y} c_{sv} - i_v \hat{y} c_{sh}}{l \hat{y} c_{sv} \hat{y} c_{sh}} \right)}}_{k}$$

In this:

$\delta_1$ signifies the calculated steering angle l signifies the wheel base m signifies the vehicle mass v signifies the vehicle speed $c_s$ v,h signifies the skew running stiffness (front, rear)

l signifies the distance between the wheel and the center of gravity k signifies a vehicle constant $a_q$ signifies a transverse acceleration A parameter which can be evaluated in the antilock brake system control algorithm represents the difference between the analog sensor signal $\delta_2$ of a steering angle pick-up and the steering angle calculated from the above equation. Depending on the magnitude of this difference, the working point in the μ-slip curve can be continuously displaced in the direction of a higher side-force coefficient, i.e. reduced peripheral force, corresponding to the arrow P in FIG. 2. If higher peripheral forces can again be transmitted, because of an excess of side force, the angle difference $(\delta_2 - \delta_1)$ decreases and the procedure takes place in the reverse direction.

A particularly advantageous application of the invention appears when separate, and if necessary different, parameters are taken for the front axle and the rear axle, i.e. the displacement of the working point is carried out separately. The intrinsic steering behavior (oversteer and understeer) of a motor vehicle in antilock brake system control operation can be specifically influenced by this means.

If, in addition to the steering angle difference, the rate of increase of the analog steering angle or the rate of increase of the steering angle difference is included in the assessment (e.g. additively or multiplicatively), the response behavior can be improved even more markedly.

In order to avoid oversensitivity of the response, the steering angle difference may be required to exceed a certain threshold (e.g. 10°) in order to initiate a reduction in the working point slip value. It is preferable to initiate a response in any event when the rate of increase of the difference exceeds a threshold rate, e.g. if $d(\delta_2-\delta_1)/dt$ exceeds 200°/sec. This means that a small but fast change in the steering angle will result in a prompt reduction of the thresholds for initiating brake pressure reduction (displacement of the working point toward smaller slip values).

It is also possible to require the rate of increase of the analog steering angle signal to exceed a threshold, in order to initiate a response when the steering angle difference does not exceed a threshold.

The possibility of being able to set the ratio of the peripheral forces to the side forces separately for the front and rear axles as a function of a steering angle difference provides the person applying the system with an aid of suitably influencing the intrinsic behavior of a vehicle.

In addition, it is possible to meet the wishes of the driver more rapidly by means of the information on the steering angle difference and its adaptivity without the vehicle being underbraked in the further course of the braking operation.

DETAILED DESCRIPTION OF THE PREFERRED EMBODIMENTS

Figure 3:
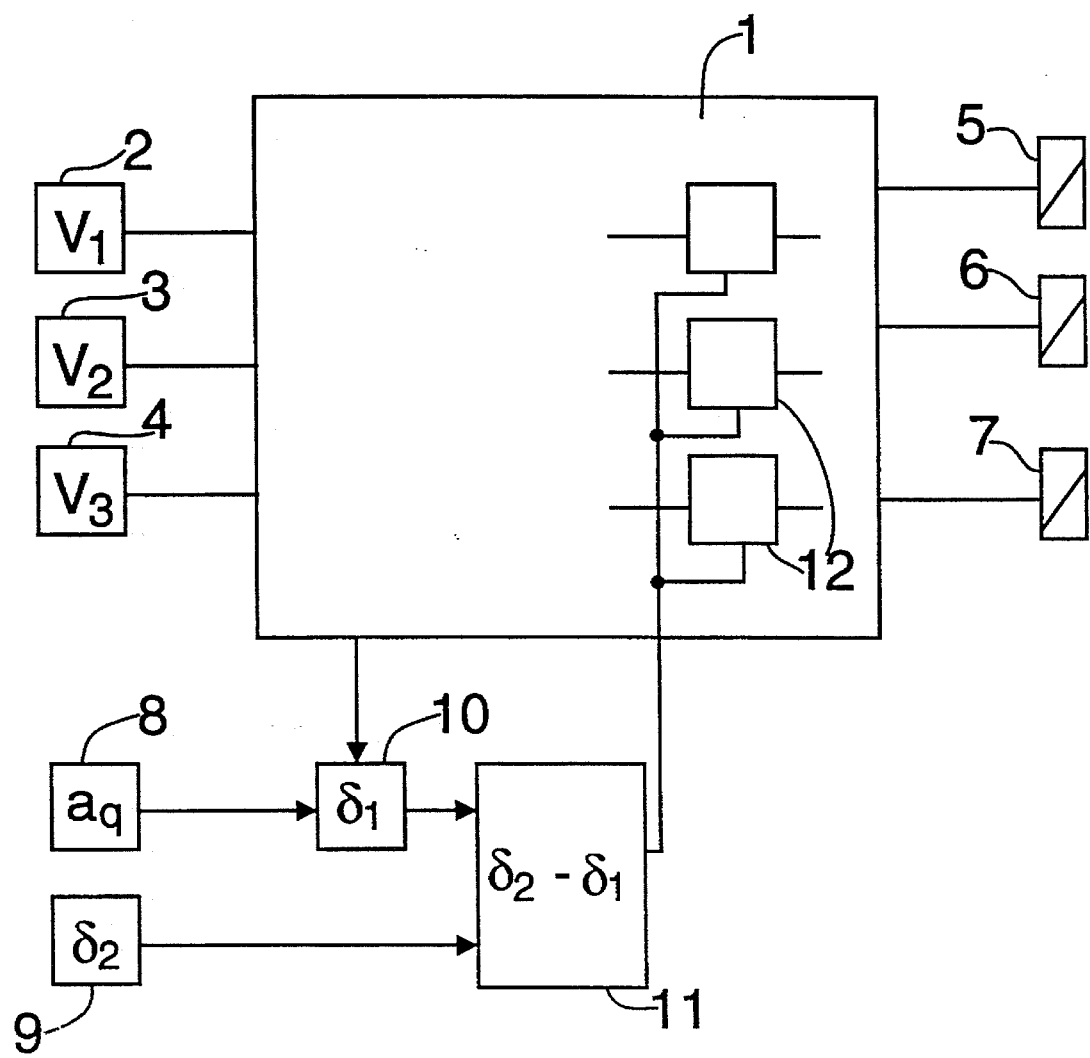
FIG. 3 is a diagram of the basic system using difference of measured and calculated steering angle as an input to influence the working point.

A block circuit diagram of a brake pressure controller is represented in FIG. 3. The speed signals $v_1$ and $v_2$ of the front wheels (sensors 2 and 3) and the speed signal $v_3$ of the rear wheels (sensor 4) are supplied to a control unit 1. When there is a tendency for the wheels to lock, the control unit 1 generates brake pressure control signals from the wheel speed signals $v_1$ to $v_3$ in accordance with known criteria and these brake pressure control signals are supplied to brake pressure control devices 5 to 7 for varying the brake pressure.

In accordance with the invention, a transverse acceleration pick-up 8 measures the transverse acceleration $a_q$ and a steering angle pick-up 9 measures the actual steering angle $\delta_2$. The steering angle $\delta_1$ is calculated in a block 10 from the constants stored there, from the transverse acceleration $a_q$ (which can also be estimated) and from the vehicle speed $v_F$ supplied by the control unit 1 and determined from the wheel speeds.

Figure 1:
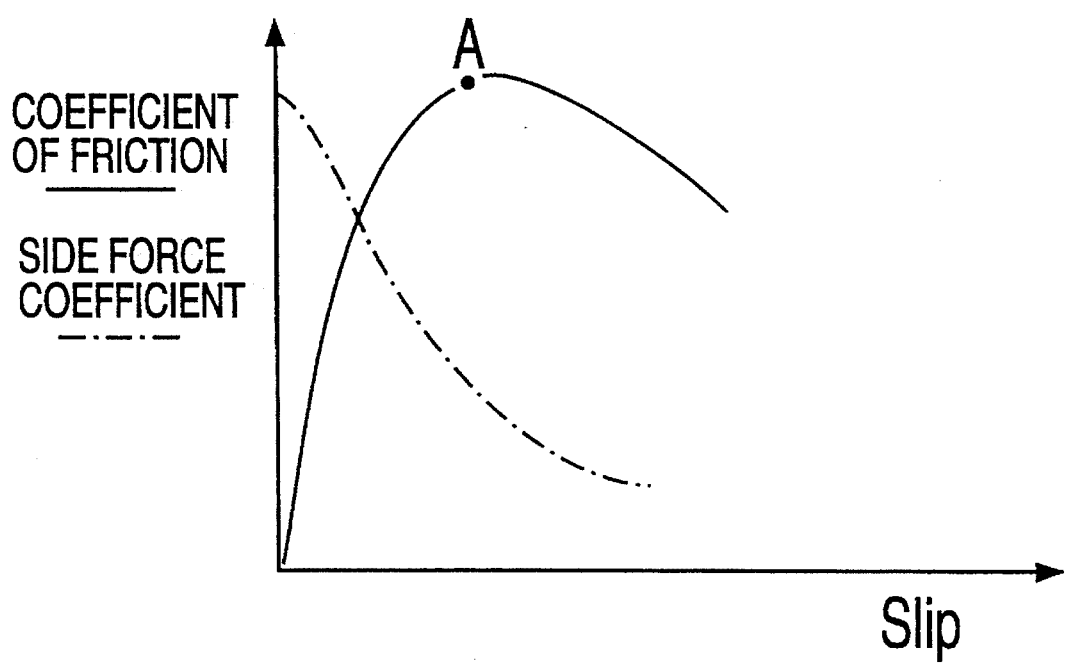
FIG. 1 is a plot of coefficients of friction versus slip.
Figure 2:
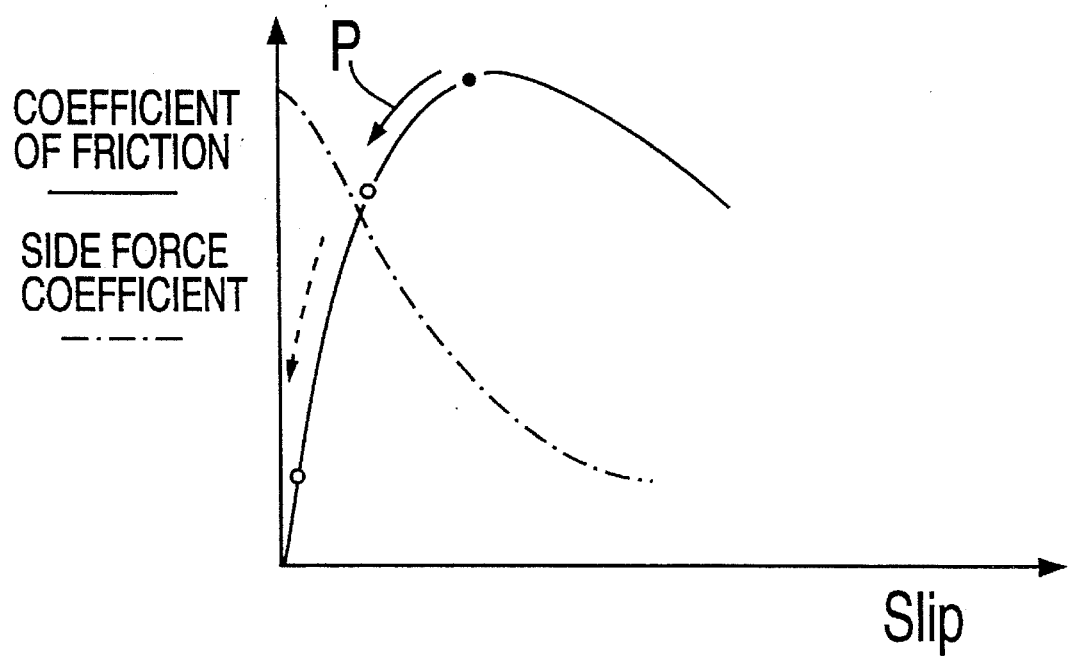
FIG. 2 is a plot showing the shift in the working point of the curve toward higher side force coefficient.

The steering angle difference $(\delta_2-\delta_1)$ is then formed in a difference forming unit 11. This difference is now used to displace the working point in the direction of the arrow of FIG. 2, the value of the difference being a measure of the displacement. In the present example, the difference signal is used to reduce the thresholds, which initiate a reduction of pressure when they are exceeded (blocks 12), so that the reduction in pressure takes place earlier when an angle difference signal is present.

Figure 4:
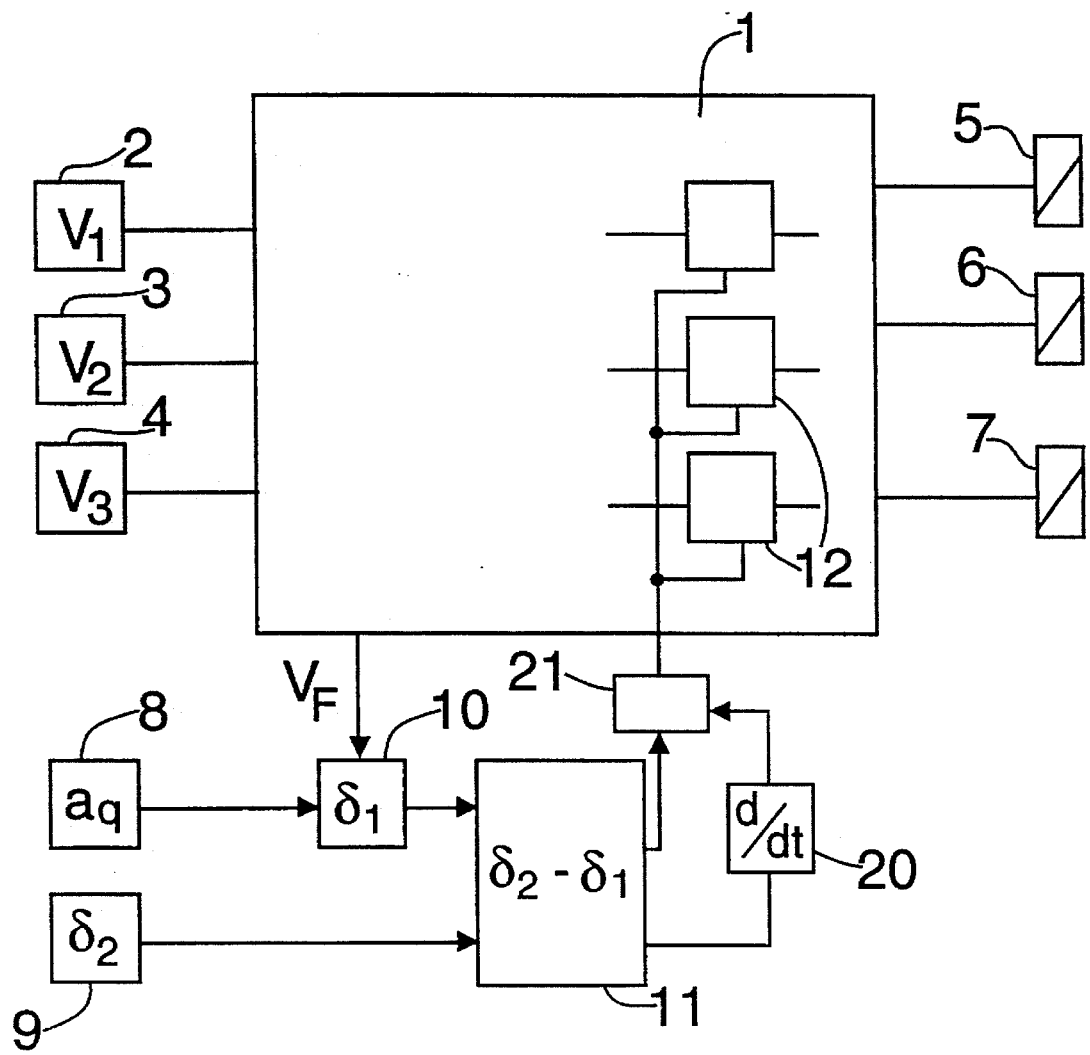
FIG. 4 is a diagram showing rate of difference change as an additional input to influence the working point.

FIG. 4 shows the rate of increase of the steering angle differnce as an input to influence the working point for reducing brake pressure. Here the difference calculated in block 11 is fed to a differentiator 20 which (based on time or frequency of the inputs) calculates the rate for input to block 21. Here the information is combined either additively, e.g. $(\delta_2-\delta_1)+d(\delta_2-\delta_1)/dt$, or multiplicatively, e.g. $(\delta_2-\delta_1) \times d(\delta_2-\delta_1)/dt$, and fed to the controller to reduce the slip thresholds.

Figure 5:
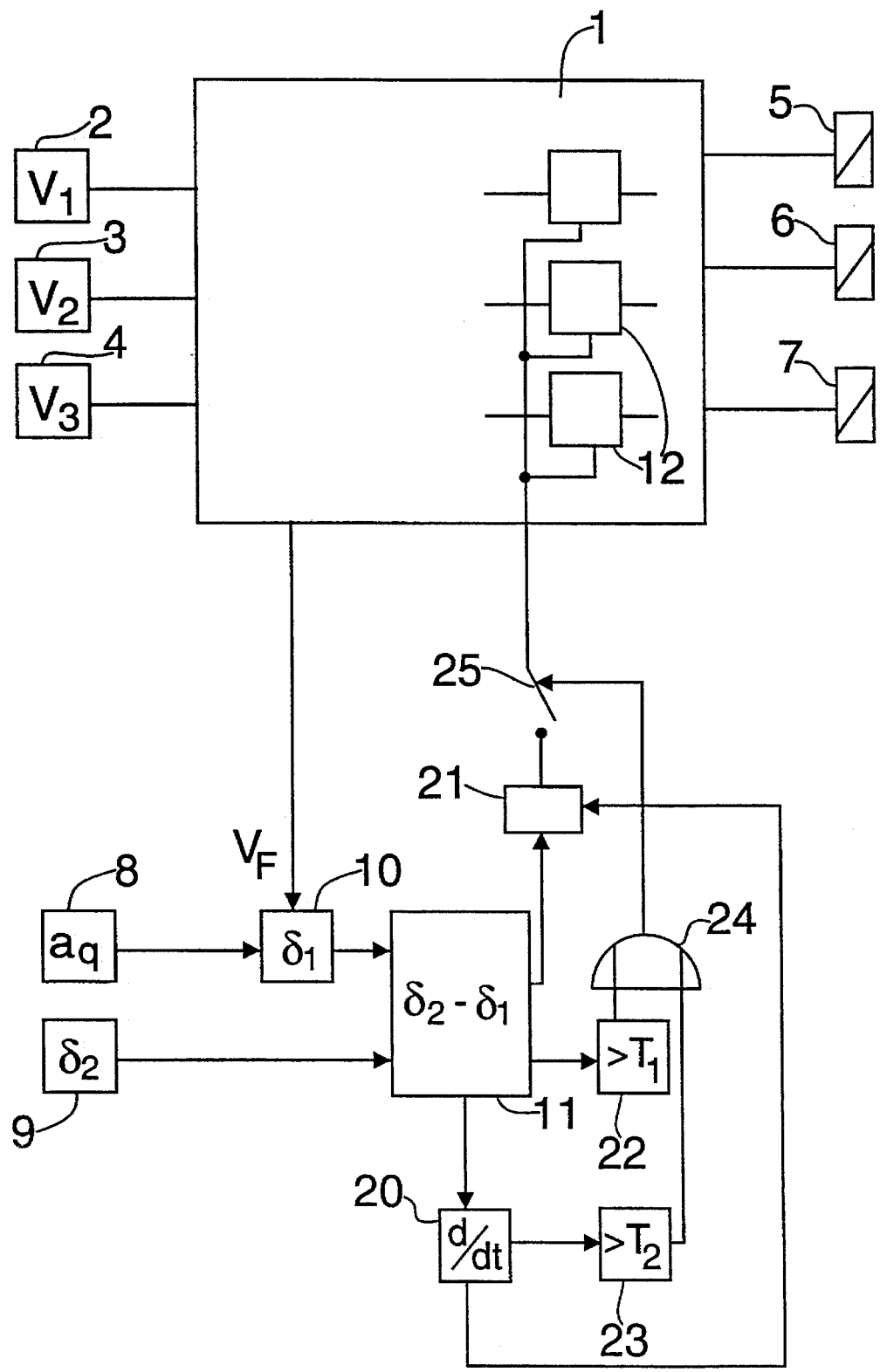
FIG. 5 is a diagram showing threshold requirements for the steering angle difference and rate of change of the difference.

FIG. 5 shows the comparison of the difference $\delta_2-\delta_1$ to a threshold (e.g. 10°) in a comparator 22. If the threshold is exceeded, the OR-gate 24 is satisfied and the switch 25 closes and admits the value from block 21 to the controller 1 for reducing slip thresholds. Alternatively the OR-gate may be satisfied if the comparator 23 determines that the rate of increase of the difference (as determined in differentiator 20) exceeds a threshold (e.g. 200°/sec).

Figure 6:
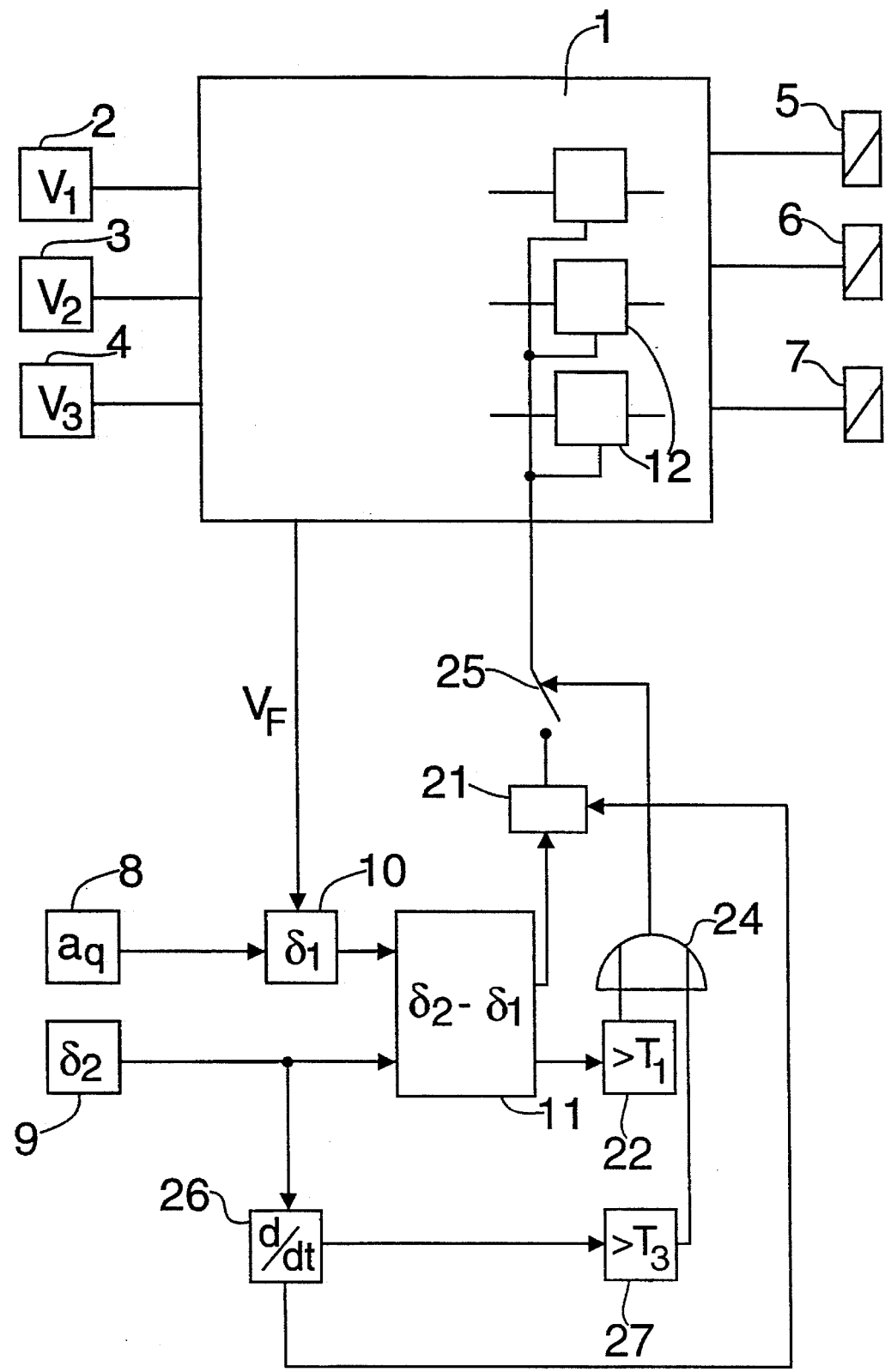
FIG. 6 is a diagram showing threshold requirements for the steering angle difference and rate of change of measured steering angle, where the rate of change of measured steering angle is an input.

FIG. 6 shows the rate of increase of the analog steering signal $\delta_2$ (via differentiator 26) as an input to block 21, for additive or multiplicative modification of the steering angle difference. Here the rate $d\delta_2/dt$ is compared to a threshold $T_3$ in comparator 27, and a signal is provided to OR-gate 24 if $T_3$ is exceeded. Switch 25 is then closed if either $T_1$ or $T_3$ is exceeded.

Figure 7:
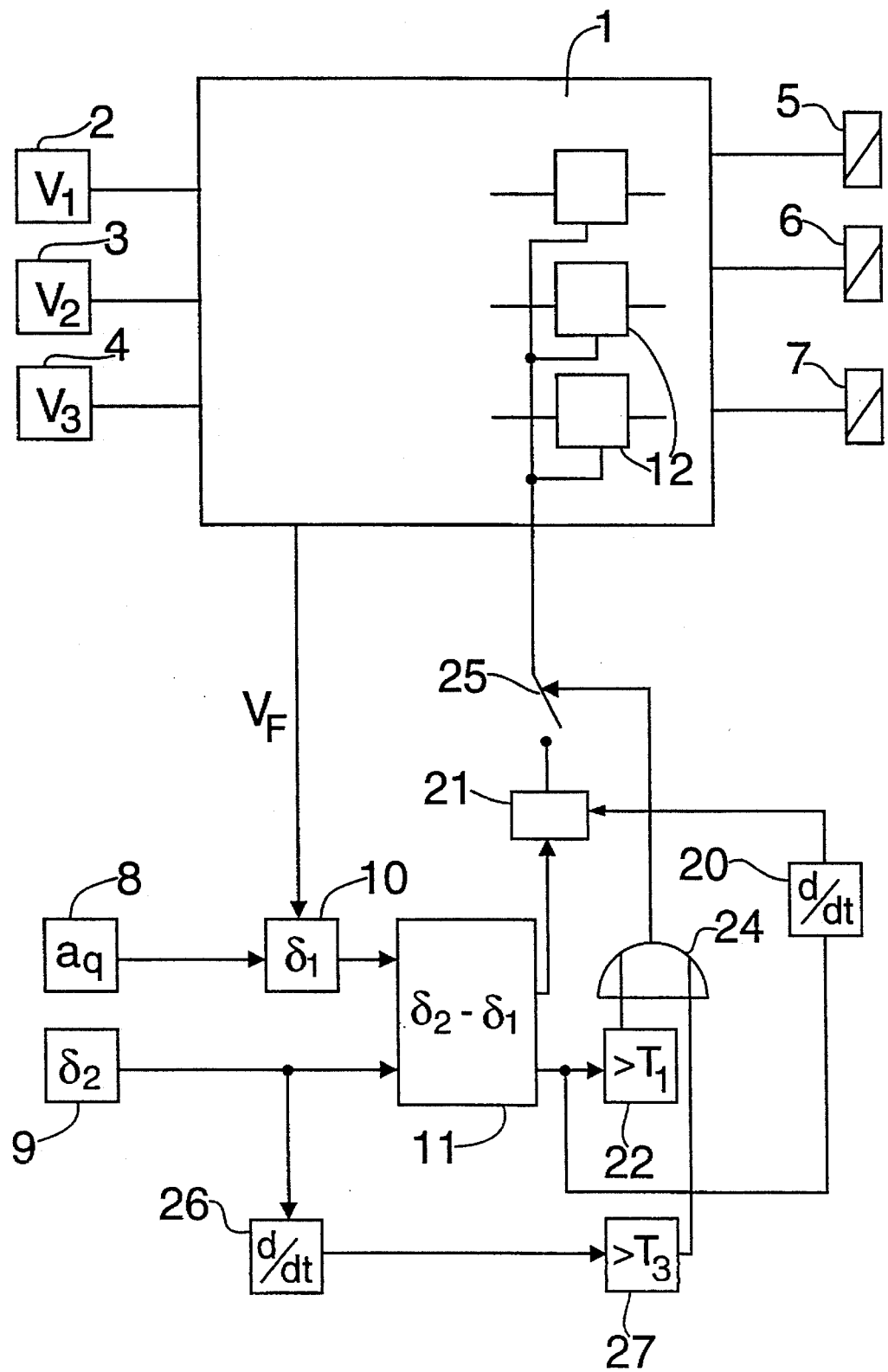
FIG. 7 is a diagram showing threshold requirements for the steering angle difference and rate of change of measured steering angle, where rate of change of the difference is an input.

FIG. 7 is a variation wherein $\delta_2-\delta_1$ and $d(\delta_2-\delta_2)/dt$ are inputs to block 21, and one of $d(\delta_2-\delta_1)/dt$ and $d\delta_2/dt$ must exceed a respective threshold in order to close switch 25 so that the inputs can be used to reduce the slip thresholds.

The foregoing is exemplary and not intended to limit the scope of the claims which follow.

We claim:

1. Method for reducing brake pressure in a vehicle equipped with front wheels and rear wheels, each wheel exhibiting a μ-slip curve, and an ABS which reduces brake pressure at the wheels when wheel slippage exceeds a working point on the respective μ-slip curve, said vehicle exhibiting a transverse acceleration and a steering angle, said method comprising measuring the actual steering angle $\delta_2$, measuring the speeds of the wheels, determining a vehicle speed $v_F$ based on the wheel speeds, determining wheel slip values based on the wheel speeds and the vehicle speed, measuring the transverse acceleration $a_q$, determining a steering angle value $\delta_1$ based on said vehicle speed $v_F$, said transverse acceleration $a_q$, and constants specific to the vehicle, determining the difference $\delta_2-\delta_1$ between the actual steering angle $\delta_2$ and the determined steering angle value $\delta_1$, displacing the working point on the μ-slip curve toward smaller slip values based on $\delta_2-\delta_1$, and reducing brake pressure at at least one said wheel when the determined slip value exceeds the working point on the respective μ-slip curve.

2. Method as in claim 1 further comprising determining a rate of change $d(\delta_2-\delta_1)/dt$ of the difference $\delta_2-\delta_1$, and displacing the working point on the μ-slip curve toward smaller and slip values based on $d(\delta_2-\delta_1)/dt$.

3. Method as in claim 1 further comprising comparing the difference $\delta_2-\delta_1$ to a first threshold value, and displacing the working point on the μ-slip curve toward said smaller slip values when $\delta_2-\delta_1$ exceeds said first threshold value.

4. Method as in claim 3 further comprising determining a rate of change $d(\delta_2-\delta_1)/dt$ of the difference $\delta_2-\delta_1$, comparing the rate of change $d(\delta_2-\delta_1)/dt$ to a second threshold value, and displacing the working point on the μ-slip curve toward said smaller slip values when $d(\delta_2-\delta_1)/dt$ exceeds said second threshold value.

5. Method as in claim 3 further comprising determining a rate of change $d\delta_2/dt$ of said actual steering angle $\delta_2$, and comparing the rate of change $d\delta_2/dt$ to a third threshold value, and displacing the working point on the μ-slip curve toward said smaller slip values when $d\delta_2/dt$ exceeds said third threshold value.

6. Method as in claim 1 further comprising determining a rate of change $d\delta_2/dt$ of said actual steering angle $\delta_2$, and displacing the working point on the μ-slip curve toward said smaller slip values based on $d\delta_2/dt$.

7. Method as in claim 1 wherein the working point of the μ-slip curve for the front wheels is determined independently of the working point of the μ-slip curve for the rear wheels, whereby the brake pressure at the front wheels may be reduced independently of the brake pressure at the rear wheels.

* * * * *

UNITED STATES PATENT AND TRADEMARK OFFICE
CERTIFICATE OF CORRECTION

PATENT NO. : 5,478,143
DATED : December 26, 1995
INVENTOR(S) : Doden et al.

It is certified that error appears in the above-indentified patent and that said Letters Patent is hereby corrected as shown below:

In column 3, line 47 of the Patent, change "$(\delta_2 - \delta_2)$" to --$(\delta_2 - \delta_1)$--.

Signed and Sealed this

Fifth Day of May, 1998

Attest:

BRUCE LEHMAN

*Attesting Officer*   *Commissioner of Patents and Trademarks*